US012665313B2

(12) United States Patent
Park et al.

(10) Patent No.: US 12,665,313 B2
(45) Date of Patent: Jun. 23, 2026

(54) ANTENNA APPARATUS

(71) Applicant: AGENCY FOR DEFENSE DEVELOPMENT, Daejeon (KR)

(72) Inventors: Byung Chul Park, Daejeon (KR); Jong Wan Heo, Daejeon (KR); Sung Jin Moon, Daejeon (KR)

(73) Assignee: AGENCY FOR DEFENSE DEVELOPMENT, Daejeon (KR)

( * ) Notice: Subject to any disclaimer, the term of this patent is extended or adjusted under 35 U.S.C. 154(b) by 51 days.

(21) Appl. No.: 18/641,632

(22) Filed: Apr. 22, 2024

(65) Prior Publication Data

US 2025/0286282 A1 Sep. 11, 2025

(30) Foreign Application Priority Data

Mar. 8, 2024 (KR) ........................ 10-2024-0033292

(51) Int. Cl.
*H01Q 13/06* (2006.01)
*H01P 3/123* (2006.01)
*H01Q 1/36* (2006.01)

(52) U.S. Cl.
CPC ............... *H01Q 13/06* (2013.01); *H01Q 1/36* (2013.01)

(58) Field of Classification Search
CPC .... H01Q 13/00; H01Q 13/02; H01Q 13/0225; H01Q 13/0275; H01Q 13/06; H01Q 13/065; H01Q 13/18; H01Q 1/36; H01P 1/17; H01P 1/171; H01P 3/12; H01P 3/123
See application file for complete search history.

(56) References Cited

U.S. PATENT DOCUMENTS

| | | | | |
|---|---|---|---|---|
| 2,954,558 | A * | 9/1960 | Honey | H01Q 13/04 343/773 |
| 4,897,609 | A * | 1/1990 | Mallavarpu | H01J 23/40 315/4 |
| 2002/0163401 | A1* | 11/2002 | Zhang | H01P 1/2131 333/135 |
| 2018/0131101 | A1* | 5/2018 | Evtyushkin | H01Q 3/30 |
| 2022/0029257 | A1* | 1/2022 | Menargues Gomez | H01P 1/165 |
| 2022/0190477 | A1* | 6/2022 | Girard | H01P 5/107 |
| 2024/0063548 | A1* | 2/2024 | Park | H01Q 13/06 |

FOREIGN PATENT DOCUMENTS

| | | | |
|---|---|---|---|
| EP | 3516738 | B1 | 11/2020 |
| KR | 20210140767 | A | 11/2012 |
| KR | 2018-0052071 | A1 | 5/2018 |
| KR | 20200129272 | A | 11/2020 |
| KR | 102266009 | B1 | 6/2021 |

OTHER PUBLICATIONS

Office Action mailed May 25, 2025, in corresponding Korean Application No. 10-2024-0033292 with English translation.

* cited by examiner

*Primary Examiner* — Thai Pham
(74) *Attorney, Agent, or Firm* — MILES & STOCKBRIDGE P.C.

(57) ABSTRACT

Provided is an antenna apparatus including a waveguide that extends in a first direction and at least one ridge that protrudes from an inner peripheral surface of the waveguide and extends in the first direction, the at least one ridge including a first ridge part that protrudes from the inner peripheral surface of the waveguide toward a central axis of the waveguide and a second ridge part that protrudes from an end of the first ridge part toward the inner peripheral surface of the waveguide.

9 Claims, 14 Drawing Sheets

ANTENNA APPARATUS

PRIORITY INFORMATION

This application claims the benefit of Korean Patent Application No. 10-2024-0033292, filed on Mar. 8, 2024, in the Korean Intellectual Property Office, the disclosure of which is incorporated herein by reference.

FIELD OF THE INVENTION

The example embodiments of the present invention generally relate to an antenna apparatus.

DESCRIPTION OF THE RELATED ART

An antenna apparatus is an element requisite for wireless communication, which may send information wirelessly over a long distance in a form of electromagnetic waves having a predetermined frequency. In particular, regarding satellite communication, high gain and a feature such as beam steering may be required for the antenna apparatus. For the antenna apparatus mounted on a communications satellite to be suitable for high gain and beam steering, the antenna apparatus may be designed as an array. In addition, to steer the beam of the antenna apparatus designed as an array, it is advantageous for distance between antenna apparatuses arrayed to be half or less than the wavelength of the electromagnetic wave transmitted, and to satisfy this, miniaturizing the antenna apparatus may be required. Also, if it is possible to transmit signals of multiple frequency bands with a single antenna apparatus, the effect of multiple antenna apparatuses may occur with the single antenna apparatus, which thus may lead to departing from a previous method of designing for each frequency band. Though related technologies have been studied, designing considering a cut-off frequency of the waveguide limits miniaturization, and limiting miniaturization leads to designing impedance matching in complex structures with difficulty. Accordingly, there is a desire for an antenna apparatus having a simple structure facilitating impedance matching design as miniaturization is possible.

SUMMARY OF THE INVENTION

An aspect provides a structure for an antenna apparatus with a simple design of an impedance-matching structure by enabling miniaturization of the antenna apparatus introduced, which is related to a ridge structure having a mushroom-shaped structure.

The present disclosure is not limited to the technical features described above, and other technical features may be inferred from example embodiments below.

According to an aspect, there is provided an antenna apparatus including a waveguide that extends in a first direction and at least one ridge that protrudes from an inner peripheral surface of the waveguide and extends in the first direction. The at least one ridge may include a first ridge part that protrudes from the inner peripheral surface of the waveguide toward a central axis of the waveguide and a second ridge part that protrudes from an end of the first ridge part toward the inner peripheral surface of the waveguide.

The second ridge part may protrude toward the inner peripheral surface of the waveguide in a second direction and a third direction that is symmetrical with the second direction about a straight line including the first ridge part on a plane intersecting the first direction.

A length in which the second ridge part protrudes in the second direction and a length in which the second ridge part protrudes in the third direction may be identical to each other.

The second ridge part may include a first portion where the length protruding in the second direction and the length protruding in the third direction along the first direction are a first length and a second portion where the length protruding in the second direction and the length protruding in the third direction are a second length.

The second portion may include a portion where the second length decreases from the first length in the first direction.

The second ridge part may include the first portion where the length protruding in the second direction and the length protruding in the third direction along the first direction are the first length and the second portion where the length protruding in the second direction and the length protruding in the third direction are the second length. The first ridge part may include a third portion where a length protruding from the inner peripheral surface of the waveguide toward the central axis of the waveguide is a third length and a fourth portion where the length protruding toward the central axis of the waveguide is a fourth length.

The second portion may include the portion where the second length decreases from the first length in the first direction. The fourth portion may include a portion where the fourth length decreases from the third length in the first direction.

According to an example embodiment, the antenna apparatus may further include an iris structure that protrudes from the inner peripheral surface of the waveguide along the plane intersecting the first direction.

The iris structure may include a fifth portion where a length protruding from the inner peripheral surface of the waveguide decreases in the first direction.

The at least one ridge may be provided in a plurality of odd numbers and provided symmetrically about the central axis of the waveguide.

According to example embodiments, it is possible to provide an antenna apparatus with a simple design of an impedance-matching structure by enabling miniaturization of the antenna apparatus introduced as a coaxial structure. In addition, it is possible to reduce a radius of the antenna apparatus, thereby improving a return loss of the antenna apparatus. In addition, it is possible to reduce the height of an iris structure and the number of iris structures applied regarding impedance matching design, thereby improving convenience for the design and fabrication of the antenna apparatus.

Additional features and advantages of the invention will be set forth in the description which follows, and in part will be apparent from the description, or may be learned by practice of the invention. The objectives and other advantages of the invention will be realized and attained by the structure particularly pointed out in the written description and claims hereof as well as the appended drawings.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate the example embodiments of the invention and together with the description serve to explain the principles of the invention. In the drawings.

DETAILED DESCRIPTION OF THE EXAMPLE EMBODIMENTS

Figure 1:
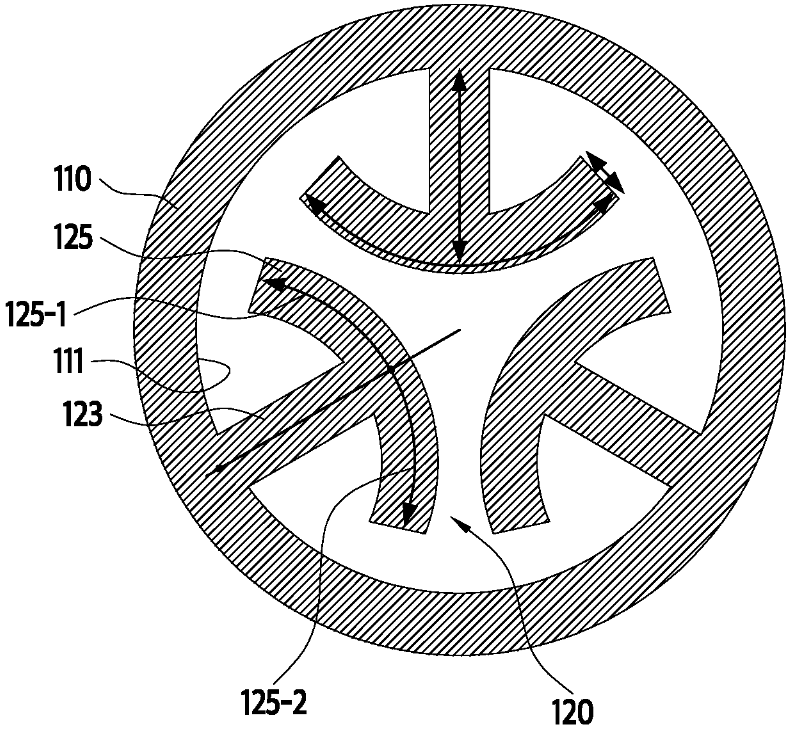
FIG. 1 is a diagram illustrating a ridge of a mushroom-shaped structure according to an example embodiment.

Terms used in the example embodiments are selected from currently widely used general terms when possible while considering the functions in the present disclosure. However, the terms may vary depending on the intention or precedent of a person skilled in the art, the emergence of new technology, and the like. Further, in certain cases, there are also terms arbitrarily selected by the applicant, and in the cases, the meaning will be described in detail in the corresponding descriptions. Therefore, the terms used in the present disclosure should be defined based on the meaning of the terms and the contents of the present disclosure, rather than the simple names of the terms.

Throughout the specification, when a part is described as "comprising or including" an element, it does not exclude another element but may further include another element unless otherwise stated.

Expression "at least one of a, b, and c" described throughout the specification may include "a alone," "b alone," "c alone," "a and b," "a and c," "b and c" or "all of a, b, and c."

In describing the example embodiments, descriptions of technical contents that are well-known in the art to which the present disclosure belongs and are not directly related to the present specification will be omitted. This is to more clearly communicate without obscuring the subject matter of the present specification by omitting unnecessary description.

For the same reason, some elements are exaggerated, omitted, or schematically illustrated in the accompanying drawings. In addition, the size of each element does not fully reflect the actual size. In each drawing, the same or corresponding elements are assigned the same reference numerals.

Advantages and features of the present disclosure, and a method of achieving the advantages and the features will become apparent with reference to the example embodiments described below in detail together with the accompanying drawings. However, the present disclosure is not limited to the example embodiments disclosed below and may be implemented in various different forms. The example embodiments are provided only so as to render the present disclosure complete and completely inform the scope of the present disclosure to those of ordinary skill in the art to which the present disclosure pertains. The present disclosure is only defined by the scope of the claims.

Hereinafter, example embodiments will be described in detail with reference to the accompanying drawings.

FIG. 1 is a diagram showing an antenna apparatus according to example embodiments of the present disclosure.

Referring to FIG. 1, an antenna apparatus may include a waveguide 110 that extends in a first direction and at least one ridge 120 that protrudes from an inner peripheral surface 111 of the waveguide 110 and extends in the first direction. The ridge 120 may include a first ridge part 123 that protrudes from the inner peripheral surface 111 of the waveguide 110 toward a central axis of the waveguide 110 and a second ridge part 125 that protrudes from an end of the first ridge part 123 toward the inner peripheral surface 111 of the waveguide 110.

The second ridge part 125 may protrude toward the inner peripheral surface 111 of the waveguide in a second direction 125-1 and a third direction 125-2 that is symmetrical with the second direction 125-1 about a straight line including the first ridge part 123 on a plane intersecting the first direction. In this case, a length in which the second ridge part 125 protrudes toward the inner peripheral surface 111 of the waveguide in the second direction 125-1 and a length in which the second ridge part 125 protrudes toward the inner peripheral surface 111 of the waveguide in the third direction 125-2 may be identical to each other. The antenna apparatus according to an example embodiment may have a form of a ridge waveguide in a mushroom structure suitable for miniaturization through structures of the first ridge part 123 and the second ridge part 125 mentioned and may have an antenna structure easy to miniaturize with a cut-off frequency lower compared to a previous ridge waveguide.

Figure 2:
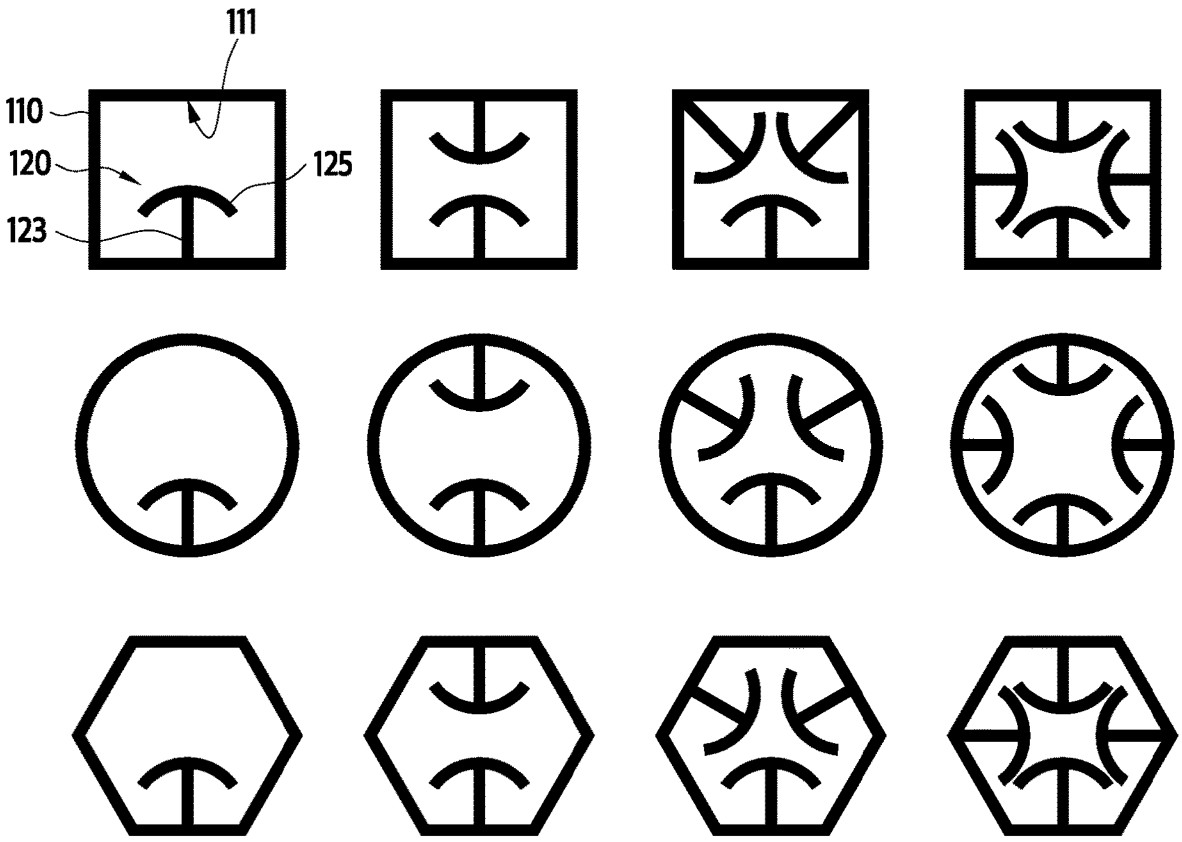
FIG. 2 is a schematic diagram illustrating various shapes of a waveguide of an antenna apparatus according to an example embodiment.

FIG. 2 is a schematic diagram illustrating various shapes of a waveguide of an antenna apparatus according to an example embodiment.

Referring to FIG. 2, the antenna apparatus according to the example embodiment may include the waveguide 110 in a shape of a pillar extending in the first direction, the waveguide 110 may have various shapes. In this case, FIG. 2 illustrates a cross-section to which the waveguide 110 is cut along a plane intersecting at a right angle to the first direction. For example, the waveguide 110 may have a shape of a hollow polygonal pillar or a hollow cylinder.

According to example embodiments, the waveguide 110 is provided in a plurality. In this case, a plurality of waveguides 110 may be arranged in a form of an array at regular intervals (that is, may be designed as an array). A distance between the plurality of waveguides 110 arranged in the form of the array, for example, may be half or less than the wavelength of an electromagnetic wave transmitted.

In addition, the antenna apparatus according to an example embodiment may further include at least one ridge 120 that protrudes from the inner peripheral surface 111 (or an inner wall) of the waveguide 110. The ridge 120 may extend in the first direction along the inner peripheral surface 111 of the waveguide 110. The ridge 120, in a cross-sectional view according to FIG. 2, may have a cross-section in a mushroom shape.

According to example embodiments, the ridge 120 may be provided in a plurality. In this case, lengths in a radial direction (that is, a direction from the inner peripheral surface 111 of the waveguide 110 toward a central axis of the waveguide 110) of each of the ridges 120 may be substantially identical. For example, when the antenna apparatus includes two ridges 120, the two ridges 120 may be provided to face each other. In addition, for example, when the antenna apparatus includes three ridges 120, the three ridges 120 may be provided at an angle of about 120 degrees (°) to each other. In addition, for example, when the antenna apparatus includes four ridges 120, the four ridges 120 may be provided at an angle of about 90° to each other. In this case, each of the ridges 120 may face another one among the ridges 120. The number of the ridges 120 according to an example embodiment may be provided as a number suitable to prevent a bandwidth of a fundamental mode from being limited due to that a cut-off frequency of a higher mode other than the fundamental mode is lowered by greater than or equal to a predetermined range. For example, at least one ridge according to an example embodiment may be provided in a plurality of odd numbers and provided symmetrically about the central axis of the waveguide. However, example embodiments according to the present disclosure are not limited to specific cases mentioned.

Figure 3:
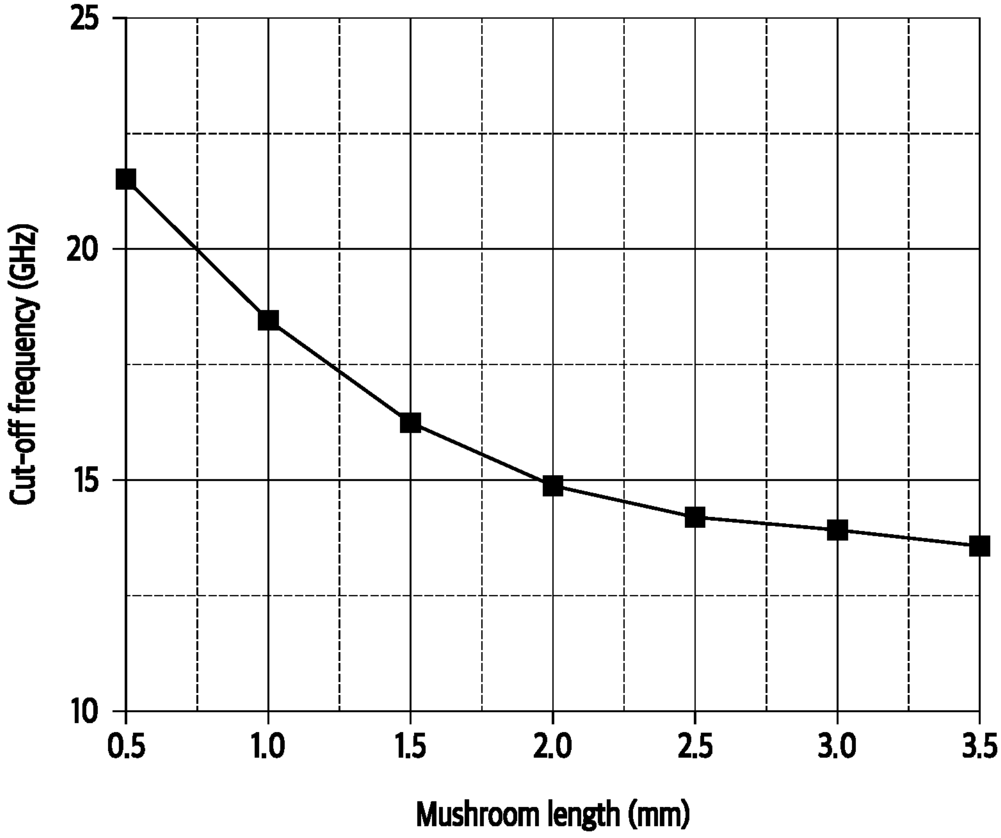
FIG. 3 is a graph illustrating a change in a cut-off frequency depending on a length of a ridge of a mushroom-shaped structure according to an example embodiment.

FIG. 3 is a graph illustrating a change in a cut-off frequency depending on a length of a ridge of a mushroom-shaped structure according to an example embodiment.

Referring to FIG. 3, in the graph, a horizontal axis represents a length ("mushroom length") of the second ridge part and a vertical axis represents the cut-off frequency of an antenna. In this case, the length ("mushroom length") of the second ridge part may represent the length in which the second ridge part 125 protrudes toward the inner peripheral surface 111 of the waveguide in the second direction 125-1 and the length in which the second ridge part 125 protrudes toward the inner peripheral surface 111 of the waveguide in the third direction 125-2 described above.

FIG. 3 shows a result of measurement for an antenna apparatus including three ridges and a waveguide in a hollow cylinder shape. In this case, for example, the diameter of the waveguide may be about 4.3 millimeters (mm), the thickness of the ridge of the waveguide, that is the thickness of the first ridge part, may be about 0.5 mm, and the length of the first ridge part may be about 1.7 mm.

Referring to FIG. 3, as the length in which the second ridge part, protruding from the end of the first ridge part toward the inner peripheral surface of the waveguide, protrudes toward the inner peripheral surface of the waveguide is longer, the cut-off frequency may be lower. For example, when the length in which the second ridge part protrudes toward the inner peripheral surface of the waveguide is about 2.0 mm to about 3.5 mm, the cut-off frequency may be about 15 gigahertz (GHz) to about 14 GHz. Accordingly, as the length in which the second ridge part protrudes toward the inner peripheral surface of the waveguide is longer, the antenna apparatus may be easily miniaturized. Thus, an unwanted grating lobe may be easily suppressed in the miniaturized antenna apparatus in the case of beam steering.

According to example embodiments, each of FIGS. 4A, 4B, 5A, 5B, 6A, and 6B shows different impedance-matching structures regarding an antenna apparatus.

Figure 4A:
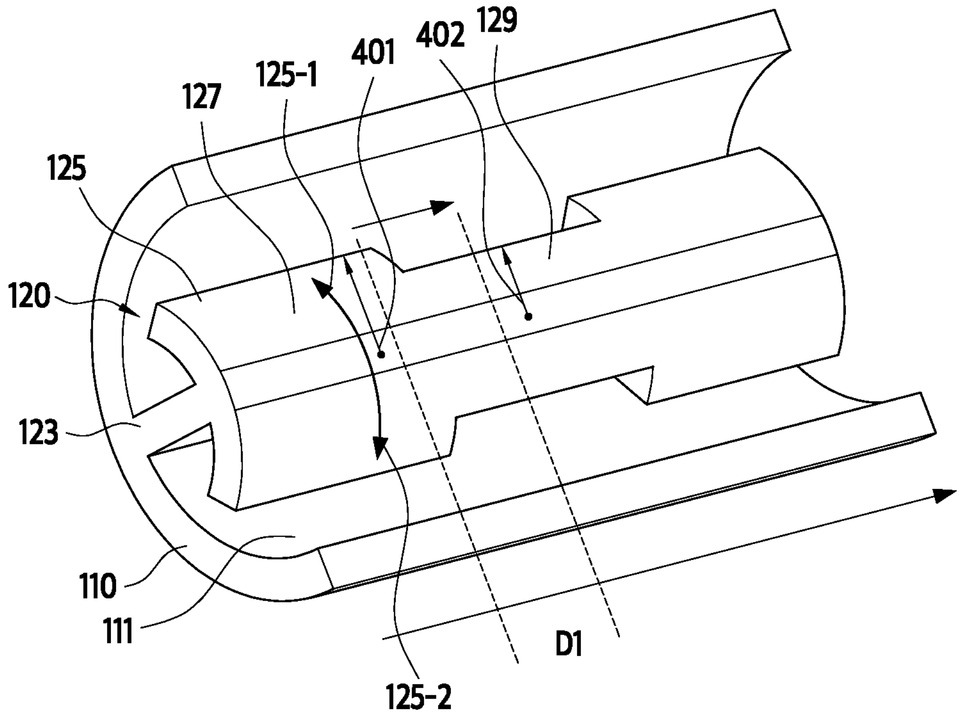
FIGS. 4A, 4B, 5A, 5B, 6A, and 6B are cross-sectional perspective views illustrating an antenna apparatus according to an example embodiment.
Figure 4B:
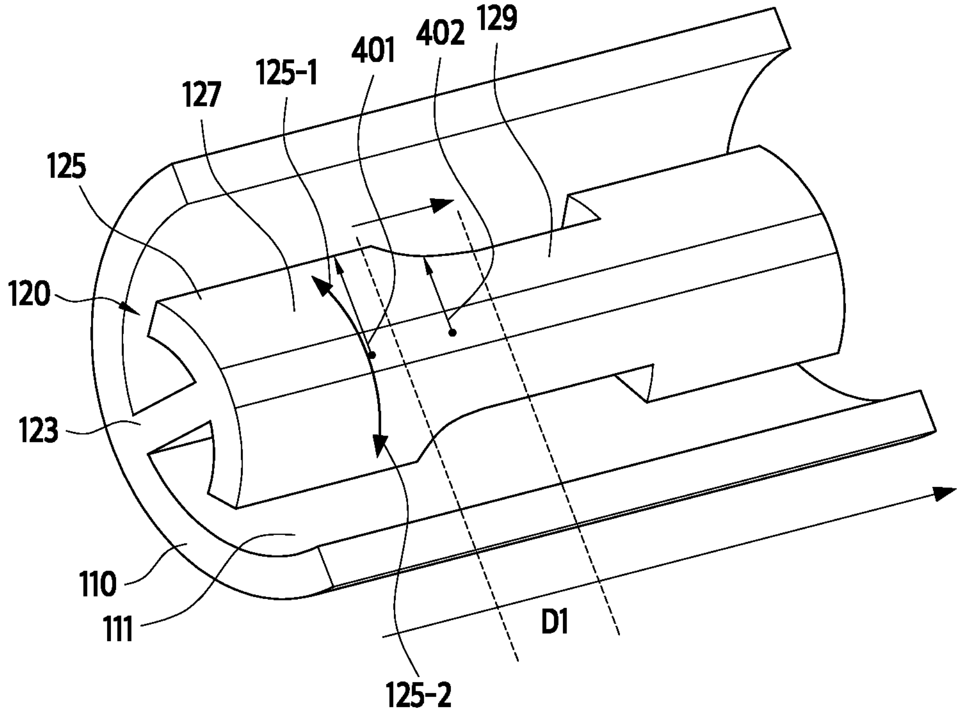
Figure 5A:
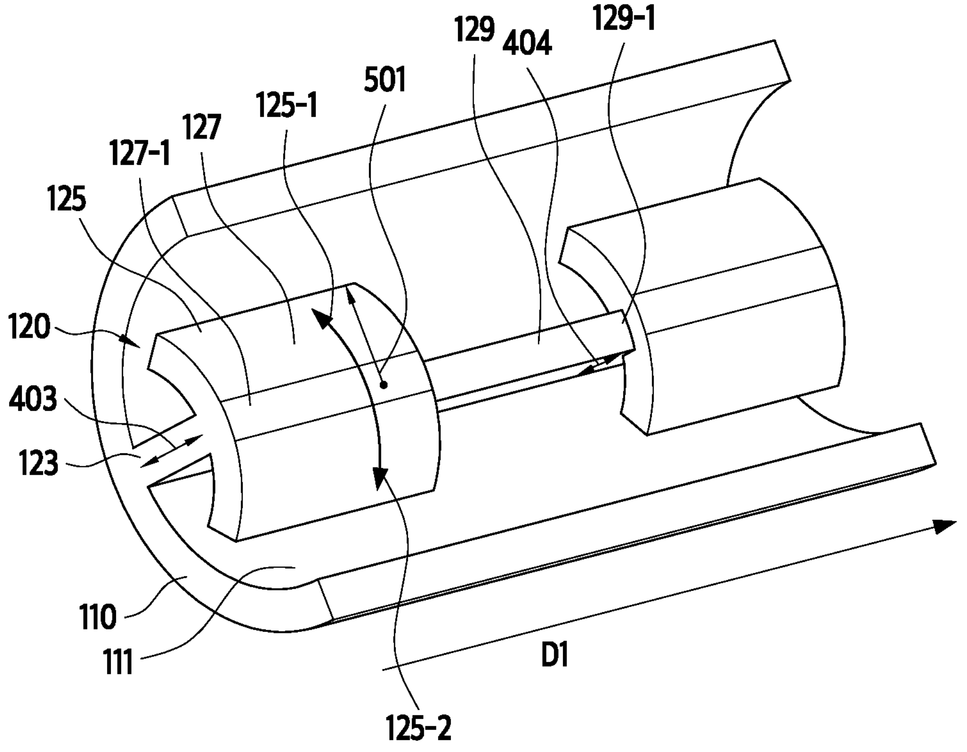
Figure 5B:
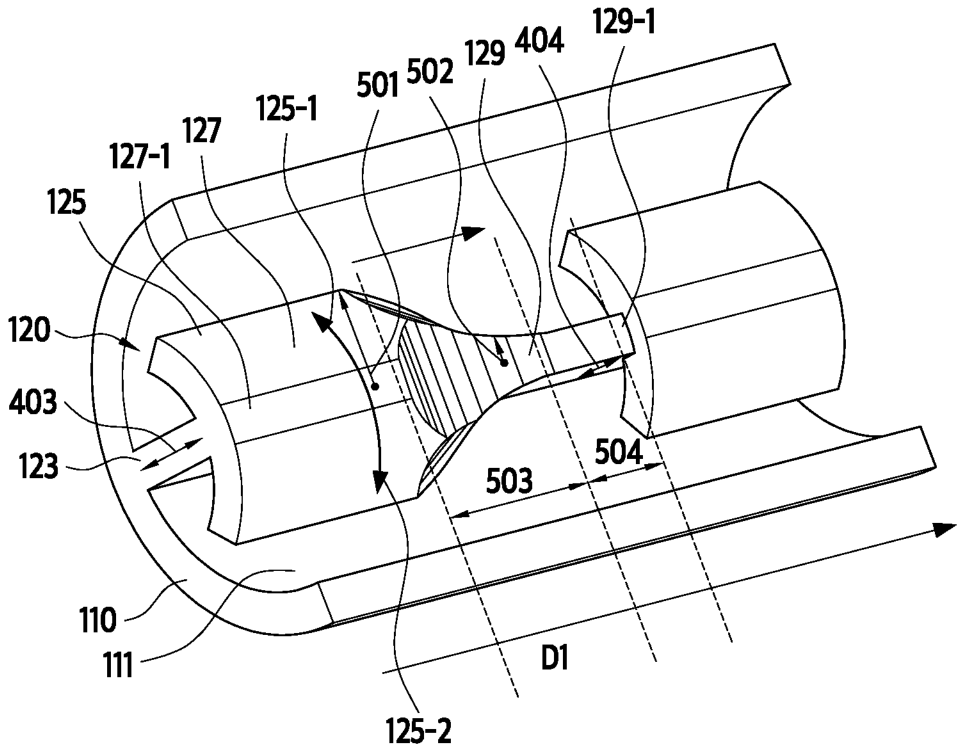
Figure 6A:
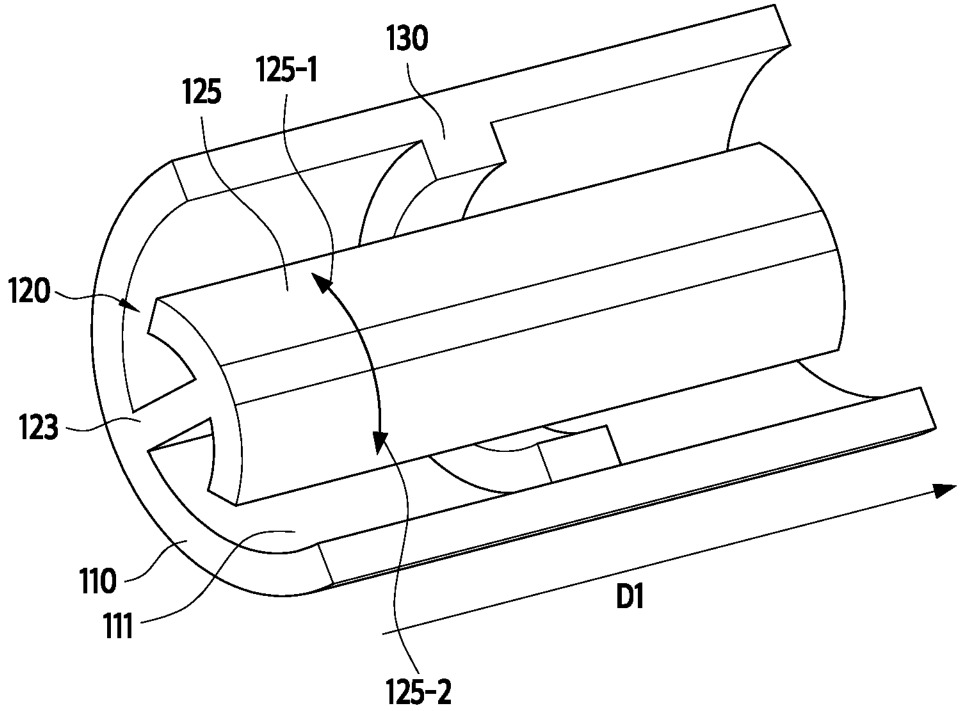
Figure 6B:
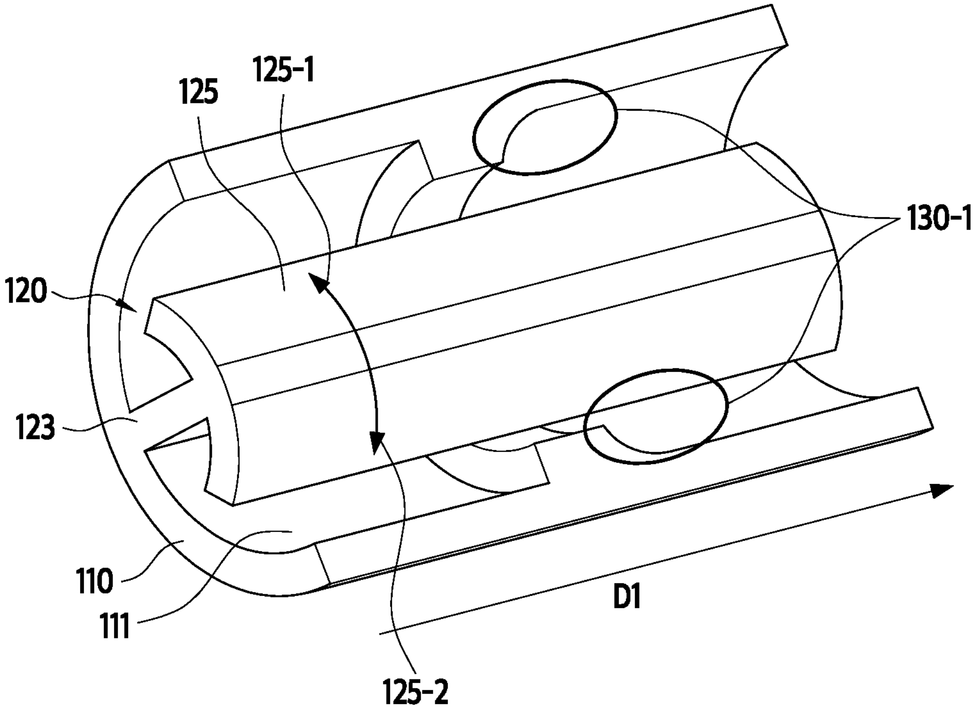

FIGS. 4A and 4B may show an antenna apparatus to which a structure that the length of the second ridge part changes is applied, FIGS. 5A and 5B may show an antenna apparatus to which a structure that the length of the second ridge part and the length of the first ridge part change is applied, and FIGS. 6A and 6B may show an antenna apparatus having an iris structure. Hereinafter, each structure will be described in detail with reference to each drawing.

FIGS. 4A, 4B, 5A, 5B, 6A, and 6B are cross-sectional perspective views illustrating an antenna apparatus according to an example embodiment.

Referring to FIGS. 4A and 4B, the antenna apparatus according to an example embodiment may include the waveguide 110 that extends in a first direction D1 and the ridge 120 that protrudes from the inner peripheral surface 111 of the waveguide 110 and extends in the first direction D1.

In an example embodiment, the ridge 120 may include the first ridge part 123 that protrudes from the inner peripheral surface 111 of the waveguide 110 toward the central axis of the waveguide 110 and the second ridge part 125 that protrudes from the end of the first ridge part 123 toward the inner peripheral surface 111 of the waveguide 110. In an example embodiment, the second ridge part 125 may protrude toward the inner peripheral surface 111 of the waveguide 110 in the second direction 125-1 and the third direction 125-2 that is symmetrical with the second direction 125-1 about the straight line including the first ridge part 123 on the plane intersecting the first direction D1. In an example embodiment, the length in which the second ridge part 125 protrudes in the second direction 125-1 and the length in which the second ridge part 125 protrudes in the third direction 125-2 may be identical to each other.

In an example embodiment, the second ridge part 125 may include a first portion 127 where the length protruding in the second direction 125-1 and the length protruding in the third direction 125-2 along the first direction D1 are a first length 401 and a second portion 129 where the length protruding in the second direction 125-1 and the length protruding in the third direction 125-2 are a second length 402. In an example embodiment, the second length 402 may be shorter than the first length 401. That is, the second ridge part 125 of the ridge 120 may have at least one recessed groove formed along the first direction D1. The recessed groove of the second ridge part 125 may be a portion of the second ridge part 125 and have a concavely recessed structure. Alternatively, the recessed groove may be a portion of the second ridge part 125 and have a structure recessed at a predetermined depth. In this specification, the recessed groove may be referred to as any one of a recessed portion of the first ridge part 123 or the second ridge part 125 of the ridge 120 and a concave portion of the first ridge part 123 or the second ridge part 125 of the ridge 120. In this case, a recessed shape may be similar to the shapes shown in FIGS. 4A and 4B. Accordingly, as identified in FIGS. 4A and 4B, the second length 402 may be shorter than the first length 401 due to the recessed structure.

The antenna apparatus according to an example embodiment, for example, may be fabricated using a three-dimensional (3D) printing process. More specifically, the antenna apparatus according to an example embodiment may be fabricated using an additive manufacturing method. In this case, a direction of additive manufacturing, for example, may be the opposite direction to the first direction D1. Accordingly, referring to FIG. 4B, at least a portion of the second portion 129 of the second ridge part 125 may have a fillet. In other words, the second portion 129 may include a portion where the second length 402 decreases from the first length 401 in the first direction D1. The antenna apparatus according to an example embodiment may support structures inside the waveguide 110 in a process of additive manufacturing through a structure including the portion where the second length 402 of the second portion 129 of the second ridge part 125 gradually decreases from the first length 401 in the first direction D1, which thus may make it easy to fabricate the antenna apparatus according to the example embodiment.

FIGS. 5A and 5B are cross-sectional perspective views illustrating an antenna apparatus according to an example embodiment. Hereinafter, for convenience of explanation, contents substantially identical as described referring to FIGS. 4A and 4B will be omitted, and a difference thereof will be described in detail. Referring to FIG. 5A, the second ridge part 125 of the ridge 120 of the antenna apparatus according to an example embodiment may include the first portion 127 where the length protruding in the second direction 125-1 and the length protruding in the third direction 125-2 along the first direction D1 are a first length 501. The first ridge part 123 of the antenna apparatus may include a third portion 127-1 where a length protruding from the inner peripheral surface 111 of the waveguide 110 toward the central axis of the waveguide 110 is a third length 403 and a fourth portion 129-1 where the length protruding toward the central axis of the waveguide 110 is a fourth length 404. That is, the ridge 120 of the antenna apparatus may include a recessed groove in the first ridge part 123. That is, the first ridge part 123 of the ridge 120 may have at least one recessed groove formed along the first direction D1. The recessed groove may be a portion of the first ridge part 123 and have a structure recessed at a predetermined depth. In this case, a recessed shape may be similar to the shape shown in FIG. 5A.

Referring to FIG. 5B, the second ridge part 125 of the antenna apparatus according to an example embodiment may include the first portion 127 where the length protruding in the second direction 125-1 and the length protruding in the third direction 125-2 along the first direction D1 are the first length 501 and the second portion 129 where the length protruding in the second direction 125-1 and the length protruding in the third direction 125-2 are a second length 502. The first ridge part 123 may include the third portion 127-1 where the length protruding from the inner peripheral surface 111 of the waveguide 110 toward the central axis of the waveguide 110 is the third length 403 and the fourth portion 129-1 where the length protruding toward the central axis of the waveguide 110 is the fourth length 404.

For example, the antenna apparatus may be fabricated using the 3D printing process. More specifically, the antenna apparatus according to an example embodiment may be fabricated using the additive manufacturing method. In this case, the direction of additive manufacturing, for example, may be the opposite direction to the first direction D1. Accordingly, referring to FIG. 5B, at least a portion of the second portion 129 of the second ridge part 125 and at least a portion of the fourth portion 129-1 of the first ridge part 123 may have fillets. In other words, the second portion 129 of the second ridge part 125 may include a portion where the second length 502 decreases from the first length 501 in the first direction D1, and the fourth portion 129-1 of the first ridge part 123 may include a portion where the fourth length 404 decreases from the third length 403 in the first direction D1.

For example, the ridge 120 of the antenna apparatus may include a structure 503 in which the second length 502 of the second portion 129 of the second ridge part 125 decreases in the first direction D1 and simultaneously the fourth length 404 of the fourth portion 129-1 of the first ridge part 123 decreases in the first direction D1. For example, the ridge 120 of the antenna apparatus may include a structure 504 in which, after the second length 502 of the second portion 129 of the second ridge part 125 decreases in the first direction D1, the fourth length 404 of the fourth portion 129-1 of the first ridge part 123 decreases in the first direction D1. The antenna apparatus according to an example embodiment may support structures inside the waveguide 110 in a process of additive manufacturing through the structure including the portion where the second length 502 of the second portion 129 of the second ridge part 125 gradually decreases from the first length 501 in the first direction D1 and the structure including the portion where the fourth length 404 of the fourth portion 129-1 of the first ridge part 123 gradually decreases from the third length 403 in the first direction D1, which thus may make it easy to fabricate the antenna apparatus according to the example embodiment.

Referring to FIGS. 6A and 6B, the antenna apparatus according to an example embodiment may include the waveguide 110 that extends in the first direction D1, the ridge 120 that protrudes from the inner peripheral surface 111 of the waveguide 110 and extends in the first direction D1, and an iris structure 130 that protrudes from the inner peripheral surface 111 of the waveguide 110 along the plane intersecting the first direction D1. The iris structure 130, for example, may protrude from the inner peripheral surface 111 of the waveguide 110 along the plane intersecting the first direction D1 and have a ring shape protruding toward the central axis of the waveguide 110.

The antenna apparatus according to an example embodiment may be fabricated using the additive manufacturing method. In this case, the direction of additive manufacturing, for example, may be the opposite direction to the first direction D1. Accordingly, referring to FIG. 6B, the iris structure 130 may include a fifth portion 130-1 where a length protruding from the inner peripheral surface 111 of the waveguide 110 decreases in the first direction D1. The fifth portion 130-1 may support structures inside the waveguide 110 in the process of additive manufacturing, which thus may make it easy to fabricate the antenna apparatus according to the example embodiment.

Figure 7A:
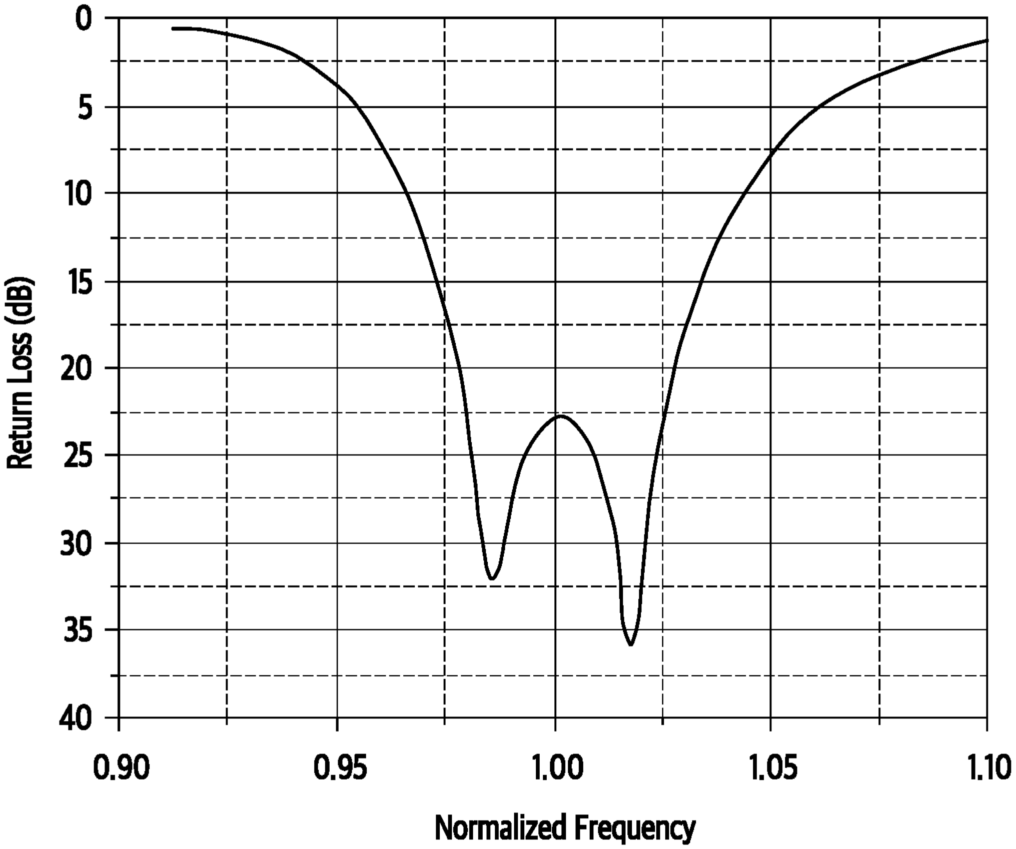
FIGS. 7A and 7B are graphs illustrating a change in a return loss depending on a frequency of an antenna apparatus according to an example embodiment.
Figure 7B:
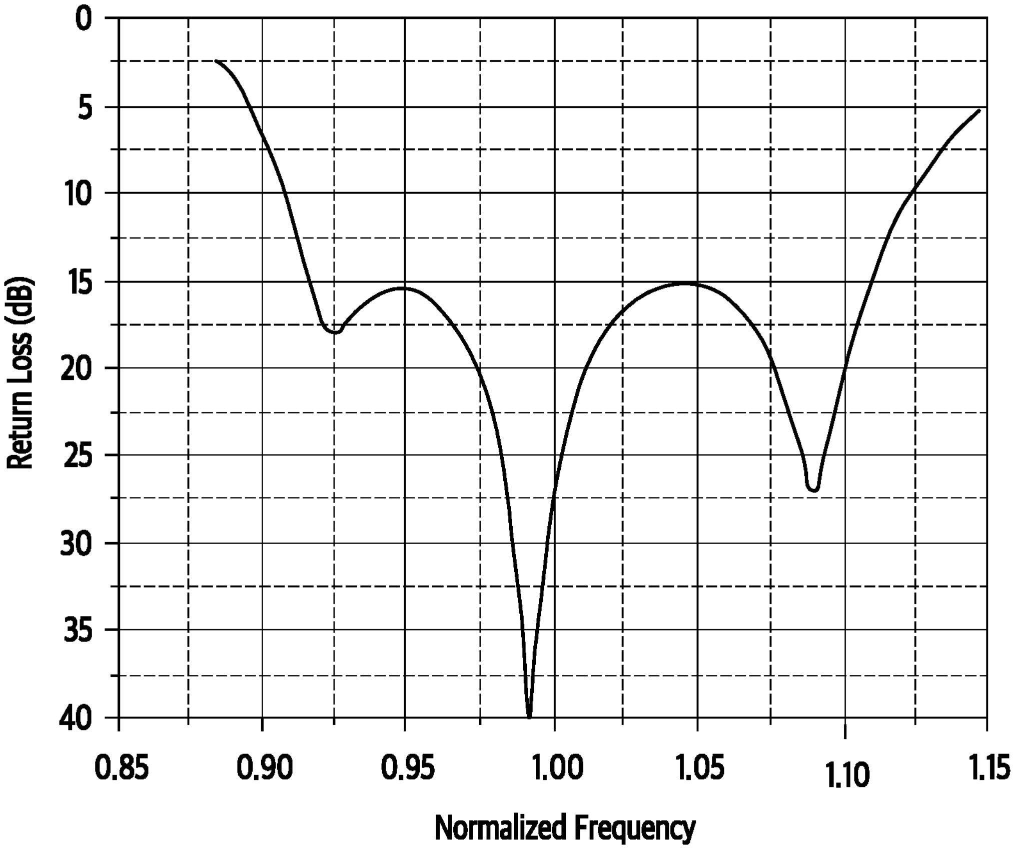

FIGS. 7A and 7B are graphs illustrating a change in a return loss depending on a frequency of an antenna apparatus according to an example embodiment.

In this case, a horizontal axis represents a ratio (that is, a normalized frequency) of a measurement frequency to a sampling frequency, and a vertical axis represents a return loss. A unit of the return loss is a decibel (dB).

FIG. 7A shows a result of measurement for a case (that is, a two-stage impedance-matching structure) in which the sum of the number of the recessed grooves explained with reference to FIGS. 4A, 4B, 5A, and 5B and the number of the iris structures explained with reference to FIGS. 6A and 6B is two. FIG. 7B shows a result of measurement for a case (that is, a three-stage impedance-matching structure) in which the sum of the number of the recessed grooves explained with reference to FIGS. 4A, 4B, 5A, and 5B and the number of the iris structures explained with reference to FIGS. 6A and 6B is three. That is, the number of impedance-matching structures in the antenna apparatus according to the present disclosure may change depending on the required bandwidth in a frequency band. For example, when the bandwidth of about 20 percent (%) in the frequency band is required, a structure with at least three stages may be suitable for an impedance-matching device, and it may be possible to directly design and implement a wideband antenna by changing the numbers according to an example embodiment.

Referring to FIGS. 7A and 7B, two peaks are in the graph in the case of the two-stage impedance-matching structure, and three peaks are in the graph in the case of the three-stage impedance-matching structure. Accordingly, based on the return loss of about 15 dB, the bandwidth in the case (about 20%) of the three-stage impedance-matching structure may be greater than that in the case (about 8%) of the two-stage impedance-matching structure. In other words, as the number (that is, the number of stages) of impedance-matching structures increases, the return loss of the antenna apparatus according to example embodiments of the present disclosure may decrease, which thus may increase the bandwidth.

Accordingly, the antenna apparatus according to an example embodiment may not only transmit power of high output but also have a wideband characteristic by an increase in the number of impedance-matching structures and thus may be used for an array antenna for communication in a military satellite or an antenna in a radar and electronic warfare system. The military satellite including the antenna apparatus according to the example embodiment may have transmission capacity thereof increased through expansion of frequency bands and application of a higher-order modulation method, which thus may maintain an excellent communication quality even in a poor radio wave environment and may guarantee information exchange in systems of surveillance and reconnaissance, command and control, and precision-guided munitions and command and control in tactical maneuvers.

Figure 8A:
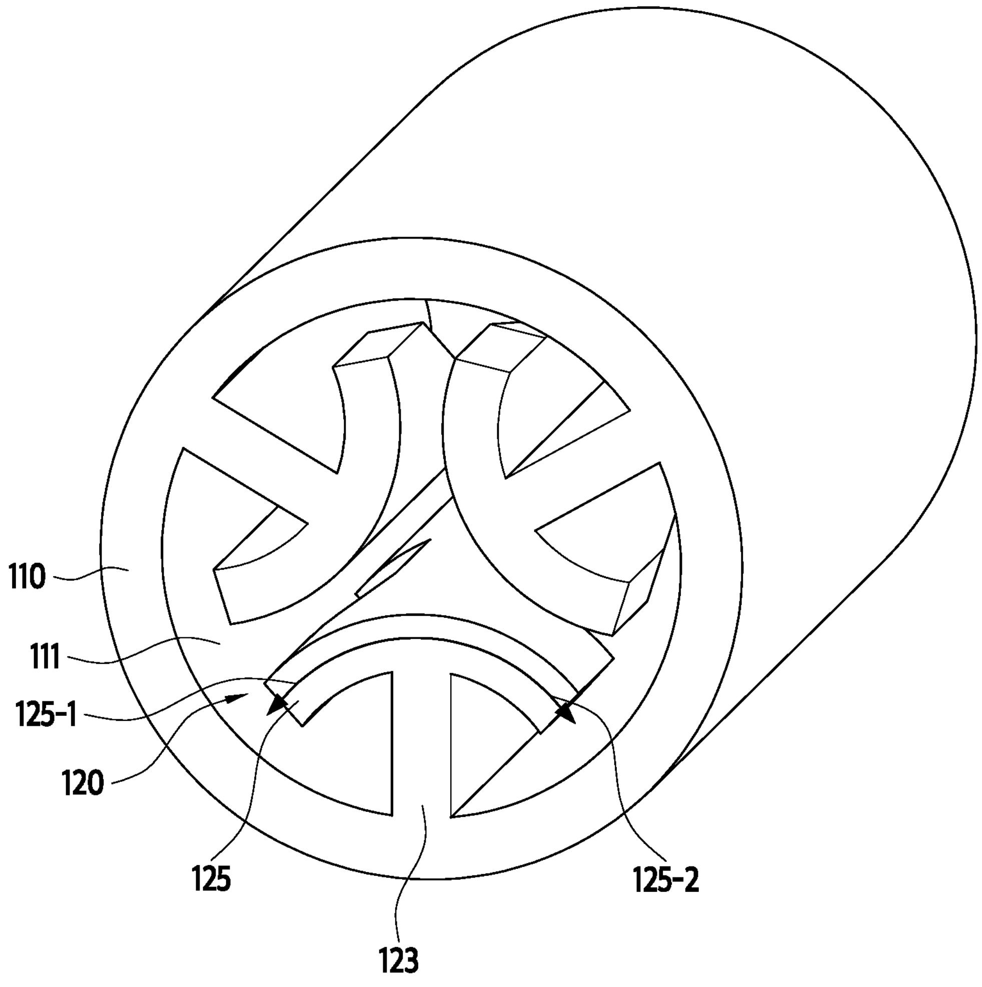
FIGS. 8A, 8B, and 8C are perspective views illustrating a cross-section of a waveguide of an antenna apparatus according to an example embodiment.
Figure 8B:
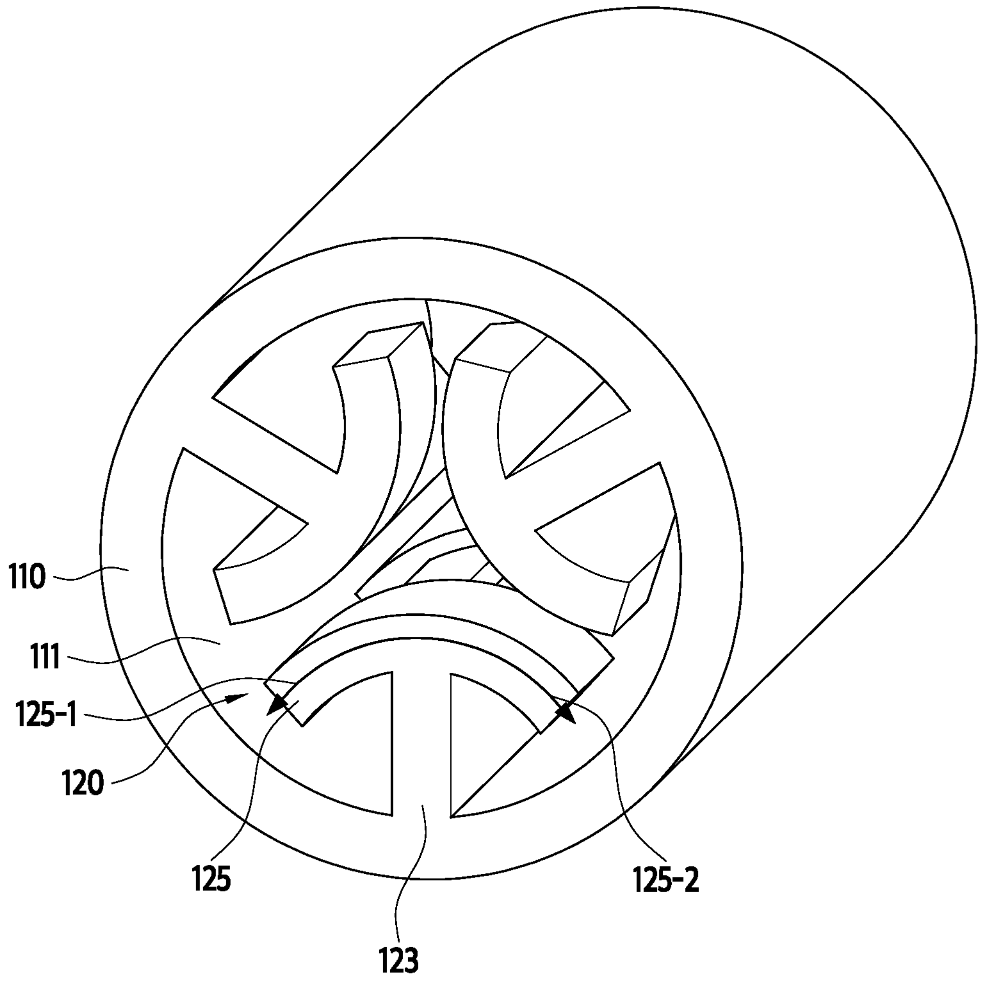
Figure 8C:
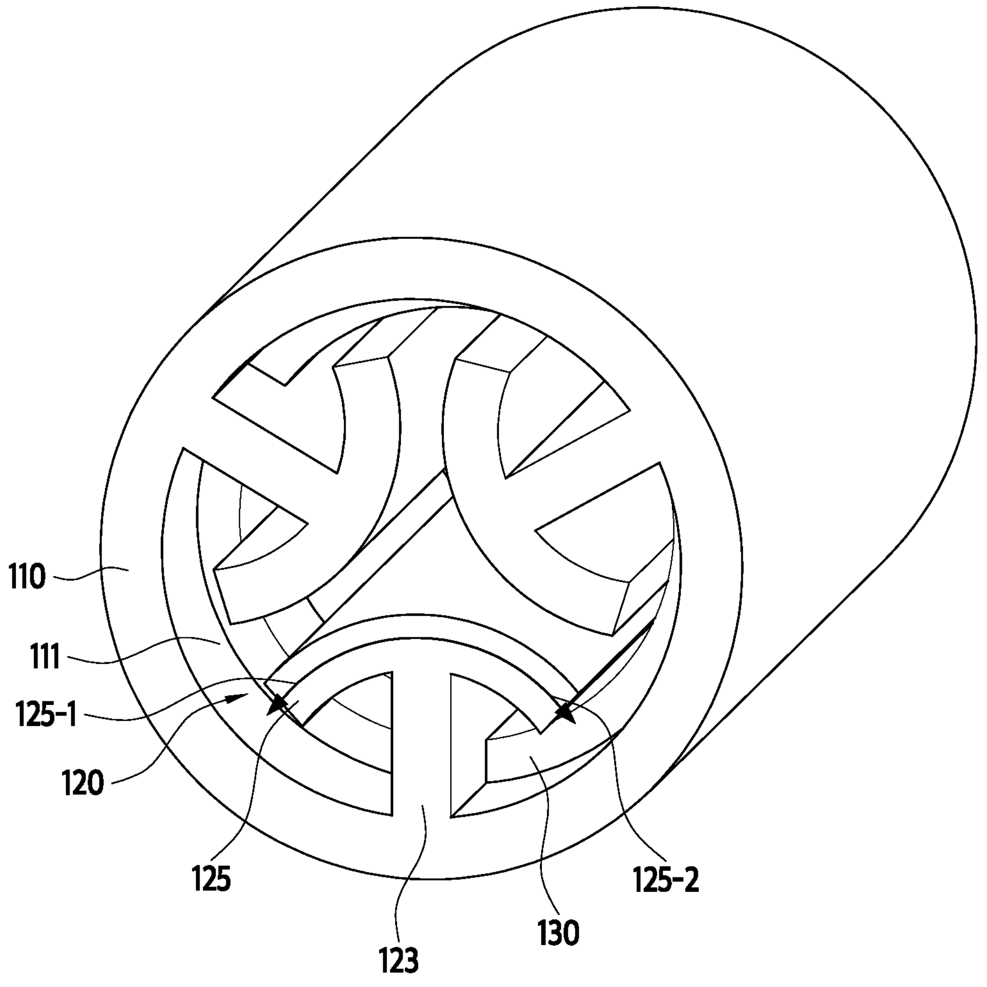

FIGS. 8A, 8B, and 8C are perspective views illustrating a cross-section of a waveguide of an antenna apparatus according to an example embodiment. Hereinafter, for convenience of explanation, contents substantially identical as described referring to FIGS. 4A, 4B, 5A, 5B, 6A, and 6B will be omitted, and a difference thereof will be described in detail.

Referring to FIGS. 8A, 8B, and 8C, various types of miniaturized antenna apparatuses to which ridges located inside an antenna apparatus are applied are shown. The ridges may include the first ridge part 123 that protrudes from the inner peripheral surface 111 of the waveguide 110 toward the central axis of the waveguide and the second ridge part 125 that protrudes from the end of the first ridge part toward the inner peripheral surface of the waveguide. The antenna apparatus to which the ridges are applied may correspond to an impedance-matching structure (that is, FIG. 8A) in which the length of the second ridge part 125 changes, an impedance-matching structure (that is, FIG. 8B) in which both of the lengths of the second ridge part 125 and the first ridge part 123 change, or a matching structure (that is, FIG. 8C) using the iris structure, based on impedance mismatching according to miniaturization.

Referring to FIGS. 8A, 8B, and 8C, an antenna apparatus including the waveguide 110 that extends in the first direction D1 and three ridges 120 that protrude from the inner peripheral surface 111 of the waveguide 110 and extend in the first direction D1 is illustrated. In this case, the second ridge part 125 of each of the ridges 120 may protrude toward the inner peripheral surface 111 of the waveguide 110 in the second direction 125-1 and the third direction 125-2 that is symmetrical with the second direction 125-1 about the straight line including the first ridge part 123 on the plane intersecting the first direction D1. The length in which the second ridge part 125 protrudes in the second direction 125-1 and the length in which the second ridge part 125 protrudes in the third direction 125-2 may be identical to each other. A portion of the second ridge part 125 and a portion of the first ridge part 123 of each of the ridges 120 may change in length along the first direction D1. The antenna apparatus may further include the iris structure 130 that protrudes from the inner peripheral surface 111 of the waveguide 110 along the plane intersecting the first direction D1. Each iris structure 130 may function as an inductor or a capacitor in a circuit, and thus an impedance mismatching issue according to the miniaturization of the antenna apparatus may be resolved.

The implementations shown and described herein are illustrative examples of the present disclosure and are not intended to otherwise limit the scope of the present disclosure in any way. For brevity, other functional aspects of the components related to the antenna may not be described in detail. Furthermore, the connecting lines or connectors shown in the drawings are intended to represent functional relationships and/or physical or circuital connections between the various elements. It should be noted that many alternative or additional functional relationships, physical connections, or circuital connections may be present in a practical device.

The use of the terms "a" and "an" and "the" and similar referents in the context of describing the present disclosure (especially in the context of the following claims) is to be construed to cover both the singular and the plural. Further, recitation of ranges of values herein are merely intended to serve as a shorthand method of referring individually to each separate value falling within the range, unless otherwise indicated herein, and each separate value is incorporated into the specification as if it were individually recited herein. Also, the operations of all methods described herein may be performed in any suitable order unless otherwise indicated herein or otherwise clearly contradicted by context. The present disclosure is not limited to the described order of the operations. The use of any and all examples, or language (e.g., "for example" and the like) provided herein, is intended merely to better illuminate the present disclosure and does not pose a limitation on the scope of the present disclosure unless otherwise claimed. Numerous modifications and adaptations will be readily apparent to those skilled in the art without departing from the spirit and scope of the present disclosure.

It will be apparent to those skilled in the art that various modifications and variations can be made in the example embodiments of the present invention without departing from the spirit or scope of the invention. Thus, it is intended that the present invention cover the modifications and variations of this invention provided they come within the scope of the appended claims and their equivalents.

What is claimed is:

1. An antenna apparatus comprising:

a waveguide that extends in a first direction; and at least one ridge that protrudes from an inner peripheral surface of the waveguide and extends in the first direction, wherein the at least one ridge includes:

a first ridge part that protrudes from the inner peripheral surface of the waveguide toward a central axis of the waveguide; and a second ridge part that protrudes from an end of the first ridge part toward the inner peripheral surface of the waveguide, wherein the second ridge part protrudes toward the inner peripheral surface of the waveguide in a second direction and a third direction that is symmetrical with the second direction about a straight line including the first ridge part on a plane intersecting the first direction, wherein the second ridge part includes a first portion having a first protruding length protruding in the second direction and the third direction along the first direction, and a second portion having a second protruding length protruding in the second direction and the third direction are a second length, and wherein the at least one ridge has a mushroom-shape structure that is configured for miniaturization and lower cut-off frequency.

2. The antenna apparatus of claim 1, wherein a length in which the second ridge part protrudes in the second direction and a length in which the second ridge part protrudes in the third direction are identical to each other.

3. The antenna apparatus of claim 1, wherein the second portion includes a portion where the second length gradually decreases from the first length in the first direction.

4. The antenna apparatus of claim 1, wherein the second ridge part includes the first portion having a first protruding length protruding in the second direction and the third direction along the first direction, and a second portion having a second protruding length protruding in the second direction and the third direction are the second length, and wherein the first ridge part includes a third portion having a third protruding length protruding from the inner peripheral surface of the waveguide toward the central axis of the waveguide, and a fourth portion having a fourth length protruding toward the central axis of the waveguide.

5. The antenna apparatus of claim 4, wherein the second portion includes the portion where the second length decreases from the first length in the first direction, and wherein the fourth portion includes a portion where the fourth length gradually decreases from the third length in the first direction.

6. The antenna apparatus of claim 1, further comprising:

an iris structure that protrudes from the inner peripheral surface of the waveguide along the plane intersecting the first direction.

7. The antenna apparatus of claim 6, wherein the iris structure includes a fifth portion where a length protruding from the inner peripheral surface of the waveguide decreases in the first direction.

8. The antenna apparatus of claim 1, wherein the at least one ridge is provided in a plurality of odd numbers and provided symmetrically about the central axis of the wave-guide.

9. The antenna apparatus of claim 1, wherein the wave-guide has a shape of a hollow polygonal pillar or a hollow cylinder.

* * * * *